(12) United States Patent
Zizzi (10) Patent No.: US 9,203,626 B2
(45) Date of Patent: Dec. 1, 2015

(54) USER AUTHENTICATION SYSTEM AND METHOD FOR ENCRYPTION AND DECRYPTION

(71) Applicant: MAZ Encryption Technologies LLC, Wilmington, DE (US)

(72) Inventor: Stephen Zizzi, Southfield, MI (US)

(73) Assignee: MAZ Encryption Technologies LLC, Wilmington, DE (US)

(*) Notice: Subject to any disclaimer, the term of this patent is extended or adjusted under 35 U.S.C. 154(b) by 0 days.

(21) Appl. No.: 14/277,238

(22) Filed: May 14, 2014

(65) Prior Publication Data

US 2014/0250304 A1    Sep. 4, 2014

Related U.S. Application Data

(63) Continuation of application No. 13/717,558, filed on Dec. 17, 2012, now Pat. No. 8,762,713, which is a continuation of application No. 12/957,479, filed on Dec. 1, 2010, now Pat. No. 8,359,476, which is a (Continued)

(51) Int. Cl.
*H04L 9/00* (2006.01)
*H04L 9/32* (2006.01)
(Continued)

(52) U.S. Cl.
CPC ............ *H04L 9/3247* (2013.01); *G06F 21/31* (2013.01); *G06F 21/32* (2013.01); *G06F 21/34* (2013.01);
(Continued)

(58) Field of Classification Search
CPC . H04L 9/0866; H04L 9/3231; H04L 2209/76; H04L 63/168; H04L 63/0428; H04L 63/08; H04L 9/3247; G06F 21/602; G06F 21/80; G06F 21/34; G06F 21/6209; G06F 21/6218; G06F 2221/2107; G06F 2211/007; G06F 21/31; G06F 21/32; G06Q 40/08; G06Q 50/16

USPC ......................................................... 713/182
See application file for complete search history.

(56) References Cited

U.S. PATENT DOCUMENTS 5,584,022 A * 12/1996 Kikuchi et al. ................. 1/1
6,023,506 A *  2/2000 Ote et al. .................. 713/165

(Continued)

OTHER PUBLICATIONS

Bellovin, "Augmented Encrypted Key Exchange: a Password-Based Protocol Secure Against Dictionary Attacks and Password File Compromise", 1993.

(Continued)

*Primary Examiner* — Matthew Smithers
(74) *Attorney, Agent, or Firm* — John R. Kasha; Kelly L. Kasha; Kasha Law LLC (57) ABSTRACT

A system configured to authenticate a user for encryption or decryption includes a user authentication apparatus, a computer-readable medium operable to communicate with the user authentication apparatus, and an encryption and decryption computer communicating with the user authentication apparatus. The computer-readable medium may store user identifying information and encryption and decryption data. The encryption and decryption computer may be configured to receive an application programming interface (API) for interfacing with the user authentication apparatus and receive the user identifying information from the computer-readable medium via the API. A user may be authenticated based on the user identifying information and, once the user is authenticated, the encryption and decryption data may be read.

9 Claims, 5 Drawing Sheets

Related U.S. Application Data continuation of application No. 12/128,501, filed on May 28, 2008, now Pat. No. 7,865,728, which is a continuation of application No. 11/382,691, filed on May 10, 2006, now abandoned, which is a continuation of application No. 10/658,246, filed on Sep. 8, 2003, now Pat. No. 7,096,358, which is a continuation-in-part of application No. 09/259,991, filed on Mar. 1, 1999, now Pat. No. 6,981,141, which is a continuation-in-part of application No. 09/074,191, filed on May 7, 1998, now Pat. No. 6,185,681.

(51) Int. Cl.
| | | |
|---|---|---|
| G06F 21/34 | (2013.01) | |
| G06F 21/60 | (2013.01) | |
| G06F 21/62 | (2013.01) | |
| G06F 21/80 | (2013.01) | |
| H04L 29/06 | (2006.01) | |
| G06F 21/31 | (2013.01) | |
| G06F 21/32 | (2013.01) | |
| H04L 9/08 | (2006.01) | |
| G06Q 40/08 | (2012.01) | |
| G06Q 50/16 | (2012.01) | |

(52) U.S. Cl.
CPC .......... *G06F 21/602* (2013.01); *G06F 21/6209* (2013.01); *G06F 21/6218* (2013.01); *G06F 21/80* (2013.01); *G06Q 40/08* (2013.01); *G06Q 50/16* (2013.01); *H04L 9/0866* (2013.01); *H04L 9/0897* (2013.01); *H04L 9/3231* (2013.01); *H04L 63/0428* (2013.01); *H04L 63/168* (2013.01); *G06F 2211/007* (2013.01); *G06F 2221/2107* (2013.01); *H04L 63/08* (2013.01); *H04L 2209/76* (2013.01)

(56) References Cited

U.S. PATENT DOCUMENTS

| | | | | |
|---|---|---|---|---|
| 6,052,468 | A * | 4/2000 | Hillhouse | 380/281 |
| 6,173,402 | B1 * | 1/2001 | Chapman | 713/182 |
| 6,185,681 | B1 * | 2/2001 | Zizzi | 713/165 |
| 6,249,866 | B1 * | 6/2001 | Brundrett et al. | 713/165 |
| 6,385,655 | B1 * | 5/2002 | Smith et al. | 709/232 |

OTHER PUBLICATIONS

Dewey, "Kernel-Level Implementation of an Encrypting File System", May, 1996.
Fu, "Group Sharing and Random Access in cryptographic Storage File Systems", 1998.
Meyer, "Cryptograph: a New Dimension in Computer Data Security—A Guide for the Design and Implementation of Secure Systems", 1982.
Nelson, "Authentication Techniques for Smart Cards", Feb. 1994.
Abelson, "The Risks of Key Recovery, Key Escrow, and Trusted Third-Party Encryption", May 1997.
Aucsmith, "Common Data Security Architecture (Intel Architecture Lab Presentation)", Jan. 22, 1996.
Baldwin, "Identity Based Encryption form the Tate Pairing to Secure Email Communications. (Univ. of Bristol)", May 2002.
Belani, "The Crisis Wide Area Security Architecture" 1998.
Blaze, "A Cryptographic File System for Unix", 1993.
Boneh, "Identity-Based Encryption from the Weil Pairing", 2001.
Boneh, "A Revocable Backup System (USENIX Security)", Jul. 1996.
Brundrett, "New Release of Transparent Cryptographic File System for Linux Announcement", Mar. 4, 1997.
Burrows, "On-line Data Compression in a Log-structured File System", Apri. 15, 1992.
Cate, "Combining the Concepts of Compression and Caching for a Two-Level Filesystem", 1991.
Chaddha, "Joint Image Classification and Compression Using Hierarchical Table-Lookup Vector Quantization," 1996.
Cocks, "An Identity Based Encryption Scheme based on Quadratic Residues", 2001.
Cox, "Proceedings of the 11th USENIX Security Symposium (2002)", Aug. 2002.
Denning, "A Taxonomy for Key Escrow Encryption Systems", Mar. 1996.
Denning, "Key Escrow Encryption Policies and Technologies," Jan. 1, 1996.
Douglis, "On the Role of Compression Distributed Systems," Dec. 5, 1993.
Ehrsam, "Cryptographic Key Authentication in File System," Mar. 1, 1978.
Epstein, "Using Fortezza for Transparent File Encryption", Dec. 9, 1996.
Everett, "Will Longhorn be Worth the Pain?", Mar. 18, 2005.
Fu, "Group Sharing and Random Access in Cryptographic Storage File Systems", Jun., 1999.
Fu, "Fast and Secure Distributed Read-Only File System (Usenix, 2000)", 2002.
Gudes, "The Design of a Cryptography Based Secure File System," Sep. 1980.
Halevi, "Storing Classified Files," Dec. 6, 1995.
Heidemann, "Stackable Layers: an Architecture for File System Development," 1991.
Jones, "Interposition Agents Transparently Interposing User Code at the System Interface", 1994.
Kaminsky, "Decentralized User Authentication in a Global File System (ACM Symposium)", 2003.
Kaufman, "Network Security—Private Communication in a Public World", 1995.
Lioy, "Secure Document Management Distribution in an Open Network Environment", 1997.
Malkhi, "Concise Version Vectors in WinFS," 2007.
Mazieres, "Separating Key Management from File System Security," Dec. 1999.
Microsoft, "Getting Data into WinFS Synchronization," Nov. 17, 2005.
Microsoft, "WinFS Wikipedia," 2003.
Microsoft, "Windows Storage Foundation Preview (Wayback)," Oct. 2005.
Miller, "Strong Security for Network-Attached Storage (Proceedings for the Fast 2002 Conference on File and Storage Technologies)," Jan. 2002.
Miltchev, "Secure and Flexible Global File Sharing (Proceedings of the Freenix Track—2003 Usenix Annual Tech. Conf.)," 2003.
Mittra, "Iolus: A Framework for Scalable Secure Multicasting," 1997.
Mont, "IBE Applied to Privacy and Identity Management (HP)", May 19, 2003.
Reiher, "Truffles—A Secure Service for Widespread File Sharing," Feb. 1993.
Reinert, "User Authentication Techniques Using Public Key Certificates," Feb. 10, 1998.
Rizzo, "WinFS 101: Introducing the New Windows File System", Mar. 17, 2004.
Shih, "Table-Lookup Approach for Compiling Two-Level Data-Processor Mappings in Hpf," 1997.
Simmons, "Contemporary Cryptology—The Science of Information Integrity," 1991.
Steiner, "An Authentication Service for Open Network Systems," Feb. 1998.
Zadok, "Ciyptfs: A Stackable Vnode Level Encryption File System," 1998.
Jones, "Securing the World Wide Web: Smart Tokens and their Implementation", 1994.

* cited by examiner

USER AUTHENTICATION SYSTEM AND METHOD FOR ENCRYPTION AND DECRYPTION

CROSS-REFERENCE TO RELATED APPLICATION

This application is a continuation of U.S. patent application Ser. No. 13/717,558, filed Dec. 17, 2012, which is a continuation of U.S. patent application Ser. No. 12/957,479, filed Dec. 1, 2010, now U.S. Pat. No. 8,359,476, which is a continuation of U.S. patent application Ser. No. 12/128,501, filed May 28, 2008, now U.S. Pat. No. 7,865,728, which is a continuation of U.S. patent application Ser. No. 11/382,691, filed on May 10, 2006, now abandoned, which is a continuation of U.S. patent application Ser. No. 10/658,246, filed Sep. 8, 2003, now U.S. Pat. No. 7,096,358, which is a continuation-in-part of U.S. patent application Ser. No. 09/259,991, filed Mar. 1, 1999, now U.S. Pat. No. 6,981,141, which is a continuation-in-part of U.S. patent application Ser. No. 09/074,191, filed May 7, 1998, now U.S. Pat. No. 6,185,681, the disclosures of which are incorporated herein by reference.

Other related applications: application Ser. No. 11/627,856 filed Jan. 26, 2007, now abandoned, which is a continuation of application Ser. No. 11/382,691.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to cryptographic systems and electronic document management systems.

2. Description of the Related Art

Global access of electronic information can be critical for even the smallest of businesses today. Very few companies operate solely within the boundaries of a single location or their employee list. Over the last 25 years technology has rapidly advanced and expanded these boundaries. The advent of such technologies as the Internet, intranets, extranets, and e-mail have made the electronic transfer of information common place in businesses today. Management of business information is critical to the success of modern businesses. A technology known as Electronic Document Management (EDM) aims to provide organizations with the ability to find any document, created in any application, by anyone, at any time, dealing with any subject, at any place in the world. EDM includes managing multiple versions of a document. PC DOCS, Inc. (Burlington, Mass.) is one of the world's leading providers of EDM solutions. With the advanced technology of EDM comes a wide variety of information that has varying economic values and privacy aspects. Users may not know what information is monitored or intercepted or who is using their computer.

An electronic document management system (EDMS) is a combination of databases, indexes, and search engines utilized to store and retrieve electronic documents distributed across an organization. An EDMS is designed to provide the structure required for an organization to properly manage and share its electronic document resources.

A wide array of information is typically stored in a company's EDMS. This includes:
 strategic and corporate plans;
 proprietary product and service information;
 confidential legal documents;
 private health information; and
 private employment information.

As companies increase the efficiency of accessing more information, their security risks also increase. According to a recent survey by Ernst & Young LLP:
 74% of the respondents said their security risks have increased over the prior two years;
 more than a quarter said that their security risks have increase at a faster rate than the growth of their computing;
 55% of the respondents lacked confidence that their computer systems could withstand an internal attack;
 71% of security professionals are not confident that their organizations are protected from external attack; and
 two thirds of the respondents reported losses resulting from a security breach over the prior two years.

The bottom line is simple—the more information available, the more security needed.

It has been said that "There is no need to break the window of a house if the front door is unlocked." This saying certainly applies to computer security. The "unlocked doors" in electronic information security include:
 e-mail;
 electronic document management "including non-EDMS file systems); and
 stolen hardware.

One of the fastest growing means of communication today is e-mail. It is estimated that over one million e-mail messages pass through the Internet every hour. E-mail provides a quick, economical, easy to use method of sharing both thoughts and electronic information. Unfortunately, e-mail is like an electronic postcard for the world to see. It is transmitted across the Internet using the Simple-mail Transfer Protocol (SMTP). This protocol has virtually no security features. Messages and files can be read by anyone who comes into contact with them.

The number of documents managed by organizations increases daily. Knowledge is becoming the most important product for companies today. As EDM enhances a company's productivity and efficiency to manage that knowledge it also exposes that company to unauthorized access to that knowledge. The typical EDMS solely relies on password protection for security.

The value of the approximately 265,000 portable computers (laptops, notebooks, palmtops) reported stolen in 1996 was $805 million, a 27% increase from 1995. However, the data on these portable computers is worth much more than the hardware itself. It is critical that the data stored on any type of hardware, whether it is a desktop computer, portable computer or server, must be properly secured from any unauthorized access.

Some of the "locks" used for electronic information security include:
 passwords,
 firewalls,
 smart cards, and
 encryption.

Passwords are often used to prevent unauthorized individuals from accessing electronic data. Passwords may also be used to link activities that have occurred to a particular individual. The problem with passwords is that if any unauthorized party steals or guesses a password, the security of the computer system may be severely compromised. Passwords are wholly inadequate for file archiving.

Systems using firewalls prevent intruders from accessing the firm's internal systems. Password-based firewall systems do not provide positive user identification nor do they protect electronic data that is stored on a server, has left the firm on a portable computer, is sent via e-mail over the Internet, or is stored on a floppy disk.

The typical smart card is a self-contained, tamper resistant, credit card size device that selves as a storage device and is equipped with an integrated microprocessor chip and non-volatile electronic memory. The smart card processes information on the integrated microprocessor chip. Security is enhanced because the user must have the smart card along with the user's confidential information (e.g., a password) to gain access to their computer files. Passwords are kept off computer hosts and on the smart card to enhance security. Smart cards typically can only be accessed with a user defined password. Many smart cards include a lock-out feature so that failed attempts at the smart card password will lock the card out to prevent any unauthorized or fraudulent use of the smart card. ISO 7816 compliant smart cards and smart card readers follow industry standards.

Increasingly, information technology professionals are turning to encryption technologies to ensure the privacy of business information. Encryption can provide confidentiality, source authentication, and data integrity. Unfortunately encryption generally is cumbersome and difficult to use. A major obstacle for the implementation of encryption technologies has been their disruption to the users' workflow.

Encryption is a process of scrambling data utilizing a mathematical function called an encryption algorithm, and a key that affects the results of this mathematical function. Data, before becoming encrypted, is said to be "clear text." Encrypted data is said to be "cipher text." With most encryption algorithms, it is nearly impossible to convert cipher text back to clear text without knowledge of the encryption key used. The strength of the encrypted data is generally dependent upon the encryption algorithm and the size of the encryption key.

There are two types of encryption: symmetric (private key) and asymmetric (public key).

Private key encryption uses a common secret key for both encryption and decryption. Private key encryption is best suited to be used in trusted work groups. It is fast and efficient, and properly secures large files. The leading private key encryption is DES (Data Encryption Standard). DES was adopted as a federal standard in 1977. It has been extensively used and is considered to be strong encryption. Other types of private key encryption include: Triple-DES, IDEA, RC4, MD5, Blowfish and Triple Blowfish.

Public key encryption uses a pair of keys, one public and one private. Each user has a personal key pair, and the user's public (or decryption) key is used by others to send encrypted messages to the user, while the private (or decryption) key is employed by the user to decrypt messages received. Public key encryption and key generation algorithms include the public domain Diffie Hellman algorithm, the RSA algorithm invented by Riversi, Shamir and Adleman at the Massachusetts Institute of Technology (MIT), and the Pretty Good Privacy algorithm (PGP) developed by Phil Zimmermann. Because of their mathematical structure, public key encryption is slower than most private key systems, thus making them less efficient for use in a trusted network or for encrypting large files.

Although these private key and public key encryption algorithms do a good job at maintaining the confidentiality of the encrypted matter, they have numerous problems. The biggest obstacle to adoption of any type of encryption system has been ease of use. Typical encryption systems are very cumbersome. They require a user to interrupt their normal work flow, save the clear text document, activate the separate encryption software, and save the cipher text document under a different name. Where the subject document is ordinary e-mail contents, the process is especially cumbersome, because the clear text must first be created in a separate application, then encrypted, then attached to the e-mail message.

A major concern in computing today is "total cost of ownership," or TCO. TCO recognizes that while a program might be inexpensive (or even free in the case of PGP for non-commercial use), there are significant costs in using the software. This includes the cost of installation, training, lost productivity during use and from bugs, and maintenance.

Even where one of the typical encryption systems might satisfy a user's TCO needs, they may not even be an available option. For example, typical EDMSes are self-contained and are not compatible with typical encryption systems.

It is therefore the object of the invention to provide a document encryption and decryption system which solves these problems. It is a further object to provide a document encryption and decryption system which works with minimal disruption of a user's normal workflow. It is a further object to provide a document encryption and decryption system which is compatible with EDMSes. It is a further object to provide a document encryption and decryption system which minimizes TCO. It is a further object to provide a document encryption and decryption system which takes advantage of the features of smart cards which are not available from pure on-line security systems.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously described element having a reference designator with the same least significant digits.

DETAILED DESCRIPTION

Figure 1:
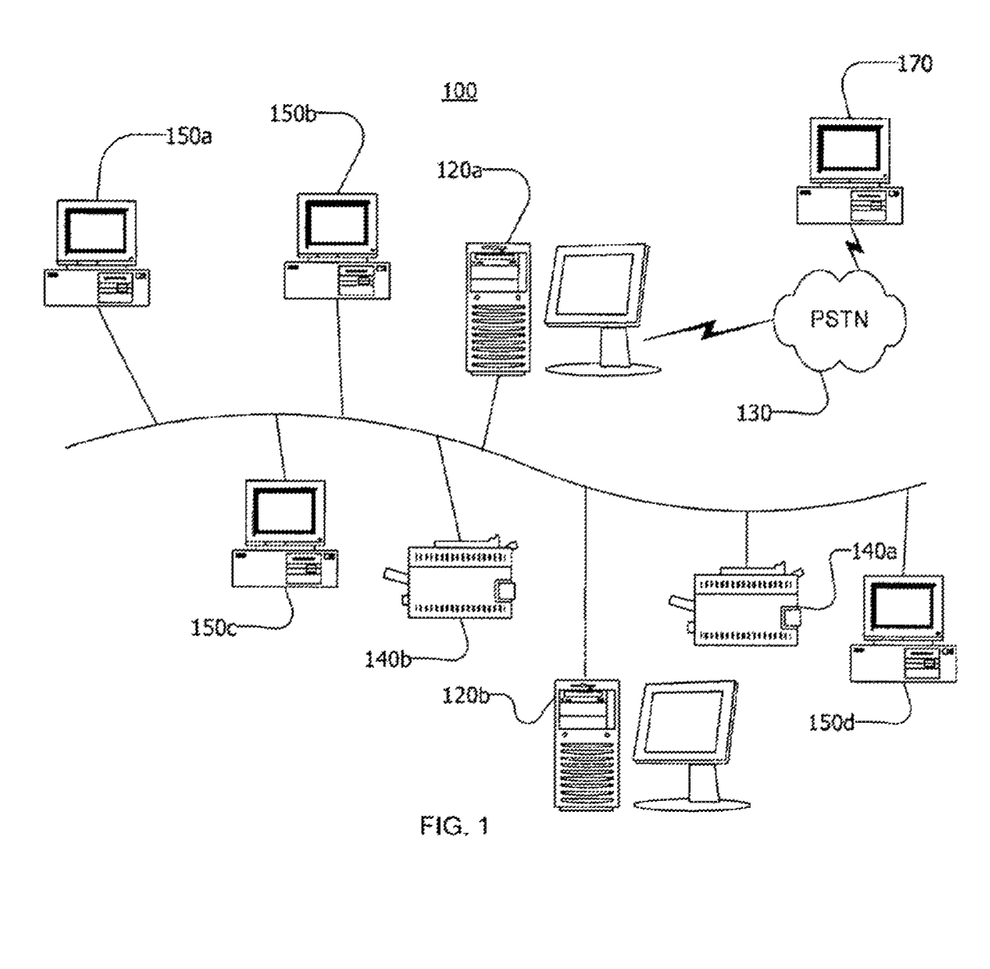
FIG. 1 is a block diagram of a computer network.

FIG. 1 shows a local area network (LAN) 100. To network communication lines 160 are coupled a number of workstations 150a, 150b, 150c, 150d. A number of file servers 120a, 120b also are coupled to the network communication lines 160. The network communications lines 160 may be wire, fiber, or wireless channels as known in the art. A user at any of the workstations 150 preferably may log on to at least one file server 120 as known in the art, and in some embodiments a workstation 150 may be logged on to multiple file servers 120. One or more remote workstations 170 may be provided for dial-in access to the server 120a through the public switched telephone network 130 or other remote access means. Network printers 140a, 140b are also provided for printing documents. The network 100 may also include hubs, routers and other devices (not shown).

Figure 2:
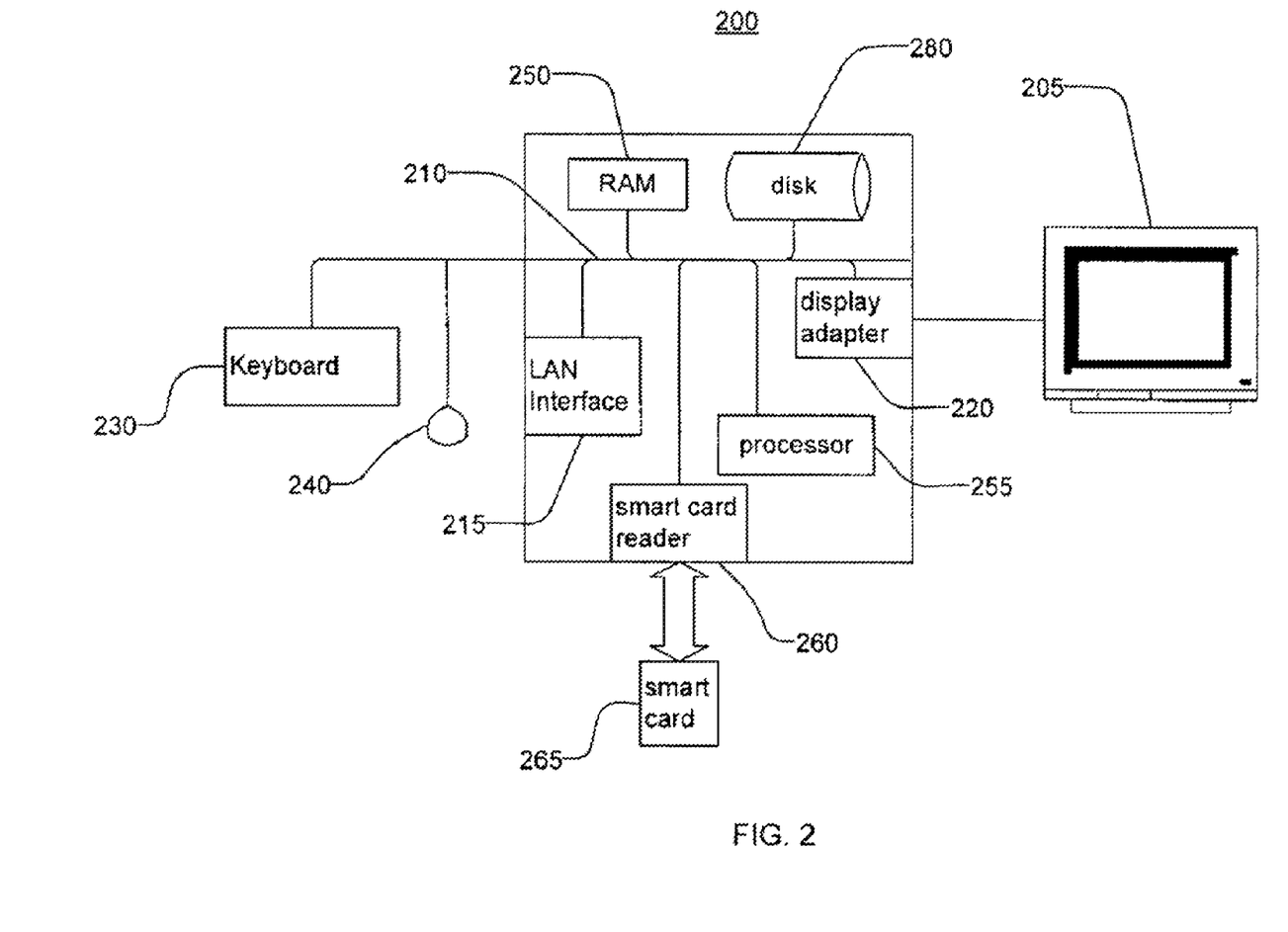
FIG. 2 is a block diagram of a general purpose computer.

FIG. 2 shows a general purpose computer 200 which is representative of the workstations 150 and file servers 120. The computer 200 preferably includes an Intel Corporation (San Jose, Calif.) processor 255 and runs a Microsoft Corporation (Redmond, Wash.) Windows operating system. In conjunction with the processor 255, the computer 200 has a short term memory 250 (preferably RAM) and a long term memory 280 (preferably a hard disk) as known in the art. The computer 200 further includes a LAN interface 215, a display 205, a display adapter 220, a keyboard 230, a mouse 240, a smart card reader 260 and a bus 210 as known in the art.

The smart card reader 260 preferably complies with ISO 7816, a standard available from the American National Standards Institute (ANSI). To interface the smart card reader 260 to the computer's Windows operating system and other software, the computer 200 preferably includes an API provided by the smart card reader manufacturer. Alternatively, the computer 200 may include Microsoft's smart card API-SCard COM, available at www.microsoft.com/smartcard.

A user's smart card 265 preferably stores a unique user ID and password and a definable hierarchy of encryption keys. The hierarchy preferably forms a table wherein a key name is associated with each key value in the table, and the table may store both encryption keys and decryption keys as necessary for the selected cryptographic algorithms. It should be appreciated that, in private key cryptography, the same key value is used for both encryption and decryption.

Although something as simple as a user ID/password scheme could be used with the keys stored in the disk 280 or memorized by the user, a data reader device and portable data storage device such as the smart card reader 260 and smart card 265 are preferred. Instead of the smart card reader 260 and smart card 265, there could be provided, for example, a biometric recognition system, wireless identification devices, hand held tokens, etc. Preferably, the portable data storage device can securely store one or more encryption and decryption keys. However, a biometric recognition system may provide key selection based on inherent biometric features, eliminating the need to actually store keys in a component external to the computer 200. Where the portable data storage device is used solely as a source of positive identification (i.e., authentication), the keys may be stored on the 120 file server for example and accessed through a certificate mechanism.

Before proceeding, a few terms are defined. By "file server" it is meant a computer which controls access to file and disk resources on a network, and provides security and synchronization on the network through a network operating system. By "server" it is meant hardware or software which provides network services. By "workstation" it is meant a client computer which routes commands either to its local operating system or to a network interface adapter for processing and transmission on the network. By "client" it is meant software which is serviced by a server. A workstation may function as a server by including appropriate software, and may be for example, a print server, archive server or communication server. By "software" it is meant one or more computer interpretable programs and/or modules related and preferably integrated for performing a desired function. By "document" it is meant a named, structural unit of text, graphics and/or other data that can be stored, retrieved and exchanged among systems and users as a separate unit.

Figure 3:
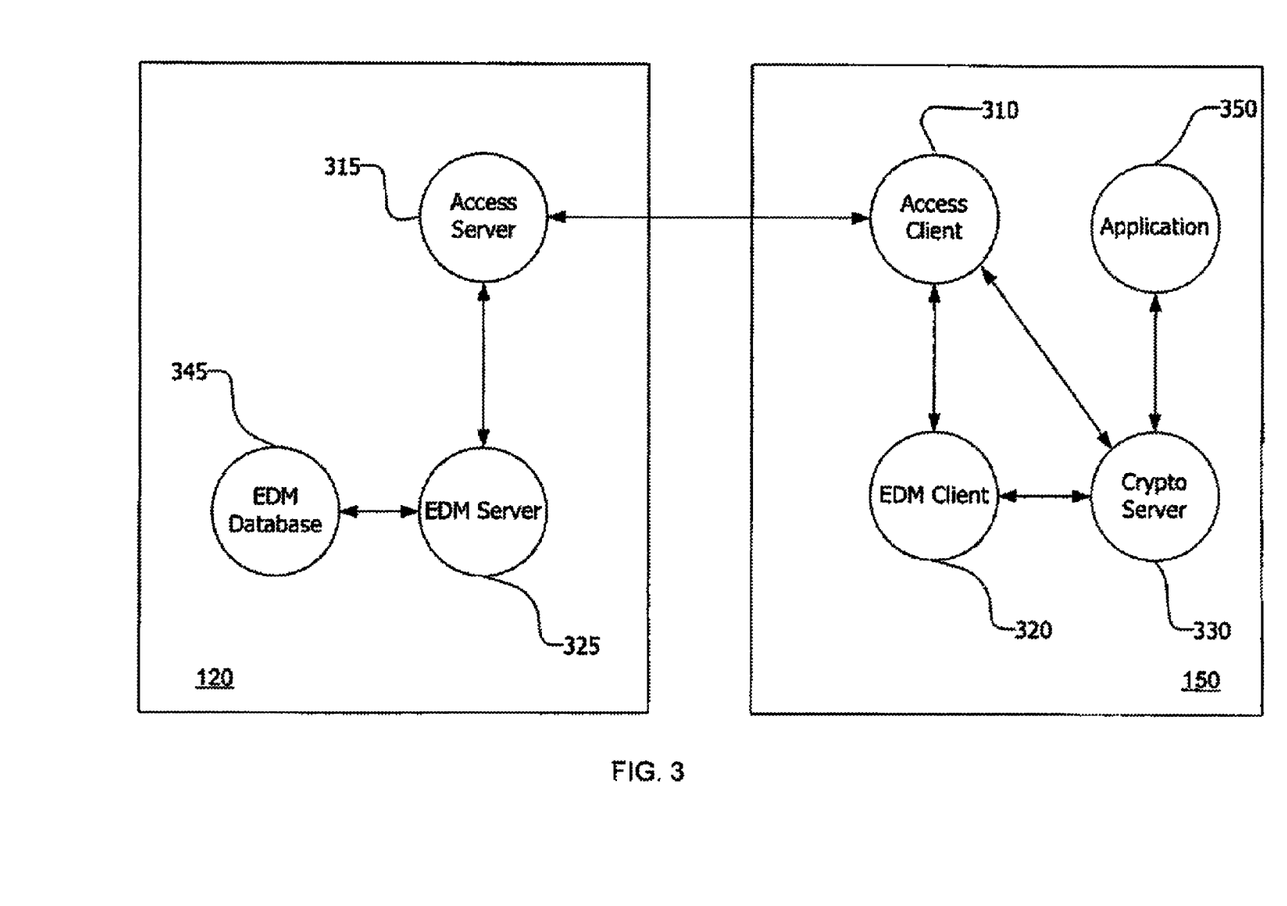
FIG. 3 is a functional block diagram of a cryptographic system.

Referring now to FIG. 3, there is shown a conceptual block diagram of several functional units relevant to the invention which operate within the file server 120 and workstation 120. The workstation 150 includes at least one application 350. The application 350 is a collection of software components used to perform specific types of user-oriented work and may be, for example, a graphic editor, a word processor or a spreadsheet.

As is typical in the art, the workstation 150 obtains access to the file server 120 through a user ID and password system which extends to the file system on the file server 120. The file server has an access server 315 for handling the filer server's user authentication and access control duties, and the workstation 150 include an access client 310 through which a user signs on to the file server 120. In the preferred embodiment, the access server 315 is a part of Windows NT Server, and the access client 310 is a part of Windows 95 and Windows NT Workstation. Other operating systems such as Unix and Novell Netware also include access servers and access clients for providing user authentication and file level security.

Within the file server 120 there is preferably an EDM server 310. To interface with the EDM server 325, the workstation 150 includes an EDM client 320, sometimes referred to as an "EDM plug-in." The EDM server 325 controls an EDM database 345 and EDM indexes (not shown), and preferably provides EDM search engines. The EDM database 345 itself may be distributed, for example across file systems and file servers, and may be entirely or partially in the workstation 150. The EDM server 325 may include a database server such as a SQL server for interfacing to the EDM database 345. The EDM client 320 provides the workstation with an interface to the EDM server and therefore allows access by a user at the workstation 150 to the EDM database 345, indexing and search services provided by the EDM server 325.

The EDMS of the preferred embodiment is SQL-based. Thus, the EDM database 345 comprises a SQL database, the EDM server 325 comprises a SQL server, and the EDM client 320 comprises a SQL plug-in. The SQL database stores file and file location information. A "repository," which could be considered part of the EDM database 345, stores the files, and is managed and distributed using techniques known in the art. In older EDM systems, the SQL plug-in comprises special software which adapted particular popular applications for use with the EDMS. However, with the promulgation of the Open Document Management Architecture (ODMA) specification, applications are available which operate seamlessly with many contemporary EDM systems. Under ODMA, the EDM plug-in registers itself so that it handles file I/O.

The EDM server 325, EDM database 345 and EDM client 320 are described herein as wholly separate from the respective operating systems of the file server 120 and workstation 150. However, much if not all of the EDM server 325, EDM database 345 and EDM client 320 could be fully integrated into and even become a part of the respective operating systems. In such an embodiment, the EDMS is just another part of an operating system's general file and data management features.

As can be seen, the access server 315 and the access client 310 functionally reside between the EDM server 325 and the EDM client 320, thereby separating the EDM server 325 and EDM client 320 with a measure of security. This aspect of FIG. 3 is the typical prior art configuration, and it provides file-level security for documents in the EDM database 345 controlled by the EDM server 325.

Positioned functionally between the application 350 and the EDM client 310 is a crypto server 330. In typical prior art systems, the application 350 would communicate directly with the EDM client 310. However, in accordance with the invention, the crypto server 330 is functionally disposed between the application 350 and the EDM client 310, and intercepts or traps I/O requests by the application which otherwise would be intercepted or trapped by the EDM client 310.

The crypto server 330 of the invention is a software module which transparently handles the encryption of documents and the decryption of encrypted documents, making encryption and decryption simple and easy to use. The crypto server 330 handles encryption and decryption without requiring user input and without normally displaying status information during normal encryption and decryption operations. Preferably, the user or a system administrator may establish a system-level configuration determinative of when error messages should be displayed. Preferably, also, the system administrator may create and maintain a file administration table in the EDM database 345 which defines criteria for which files are to be encrypted and which key to use. The crypto server 330 utilizes the file administration table, for example, to determine if a new file should be encrypted, and which encryption key to use to encrypt the new file. The crypto server 330 preferably utilizes and updates an encrypted files table in the EDM database 345 which lists each encrypted file.

The crypto server 330 may itself comprise a number of functional units. For example, the crypto server 330 preferably includes interfaces to one or more cryptographic systems, such as those described in the Description of the Related Art section above. The crypto server 330 preferably also includes an interface to the smart card reader 260 (FIG. 2) for reading the smart card 265. The smart card 265 preferably is used to keep the encryption and decryption keys separate from the workstation 150 and provide positive user identification. The crypto server 330 also works with the access client 310 in performing user authentication and access. In particular, the typical prior art user access process is enhanced by requiring that the user enter a user ID and password which are stored on the user's smart card 265.

Figure 4:
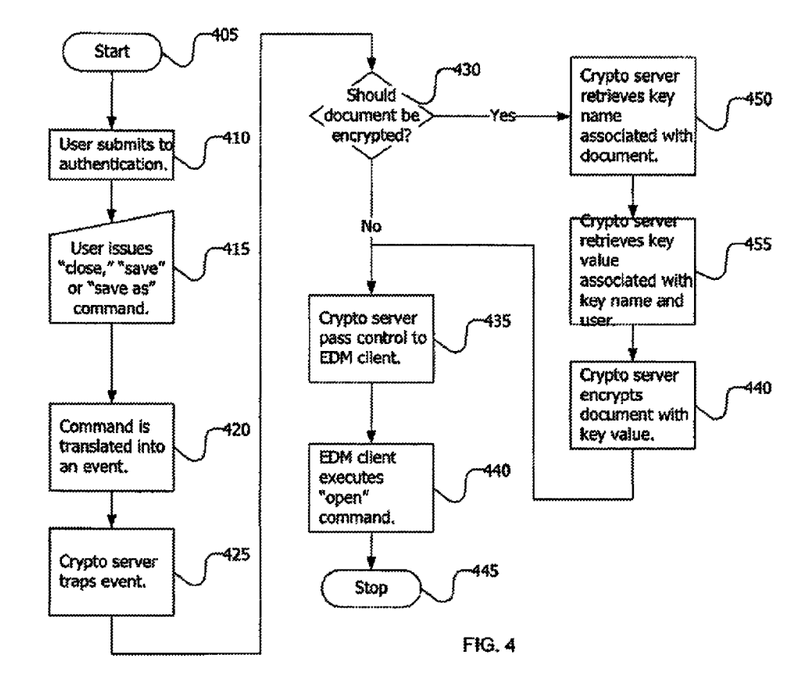
FIG. 4 is a flowchart of an encryption process.

Turning now to FIG. 4, there is shown a flowchart of the encryption process in accordance with the invention. After the process begins (step 405), it is preferred that the user submit to authentication by the access client 310 and access server 315 (step 410). The authentication step is preferably performed when the user signs onto the workstation 150. Preferably, the user must insert his smart card 265 into the smart card reader 260 and enter the user ID and password stored on the smart card 265. Once authenticated, the smart card 265 then makes available, as needed, the encryption and decryption key information stored therein.

At some point after the user has been authenticated, the user will be working on a document in the application 350, and at some point issue a "close," "save" or "save as" command as known in the art (step 415). The command is then translated into an "event" (step 420), and the crypto server 330 traps this event (step 425). Techniques for translating commands into events and trapping events are well known in the art and are typically different for each operating system. In Windows, the event translation step comprises generating an event message.

The trapped event has the effect of alerting the crypto server 330 that it may be necessary to encrypt the document. However, preferably before encrypting the document, the crypto server 330 tests whether the document should be encrypted (step 430). Preferably, at least three different tests are performed.

In the first test, the crypto server 330 tests whether the user has been authenticated. The first test is relatively simple. Where the smart card 265 or similar means is used for storing keys, this test is necessary because the keys will not even be available unless the user was authenticated.

In the second test, the crypto server 330 tests whether the document was already encrypted when it was opened by the application 350. By default, a document which was already encrypted when opened should be encrypted when closed or saved.

In the third test, the crypto server 330 tests whether the EDM database 345 has an indicator that the document should be encrypted. As described above, the EDM database 345 includes a list of encrypted documents in an encrypted files table. The EDM database 345 preferably also includes criteria for new documents which indicate whether new documents, when the criteria are met, should be encrypted. The criteria are preferably stored in the file administration table described above. To perform the third test, the crypto server 330 passes a database query to the EDM client 320 to have the EDM server 325 query the EDM database 345. For existing files, the query is directed to the encrypted files table. For new files, the query is directed to the file administration table. The EDM server 325 then passes the results of the test back to the EDM client 320, which provides the test results to the crypto server 330.

If for any reason the document is not to be encrypted, then the crypto server 330 passes control to the EDM client 320 which performs the "close," "save" or "save as" command on the unencrypted document. Alternatively, the decision not to encrypt, for one or more reasons, may result in an error message being displayed to the user, and may result in the document not being closed or saved. At this point, for documents which are not to be encrypted, the method is complete (step 445).

If, in step 430, the document is to be encrypted, then the crypto server 330 preferably obtains an encryption key name which is associated with the document (step 450).

The crypto server 330 then uses the encryption key name to retrieve an encryption key value which is associated with the encryption key name (step 455). For most encryption algorithms, the encryption key is a multi-digit number which is difficult to remember and even difficult to transcribe. The encryption key name is preferably an alphanumeric descriptor which may be used by the user and/or system administrator for administering the encryption key value. Preferably, the encryption key value is also related to the identity of the user, and this is accomplished by retrieving the encryption key value from the key table stored in the smart card 265 which is associated with the relevant encryption key name.

Once the crypto server 330 has the encryption key value, the crypto server 330 then encrypts the document with the encryption key value (step 460), and passes control to the EDM client (step 435) so that the document may be saved (step 440). At this point, for documents which are to be encrypted, the method is complete (step 445).

Figure 5:
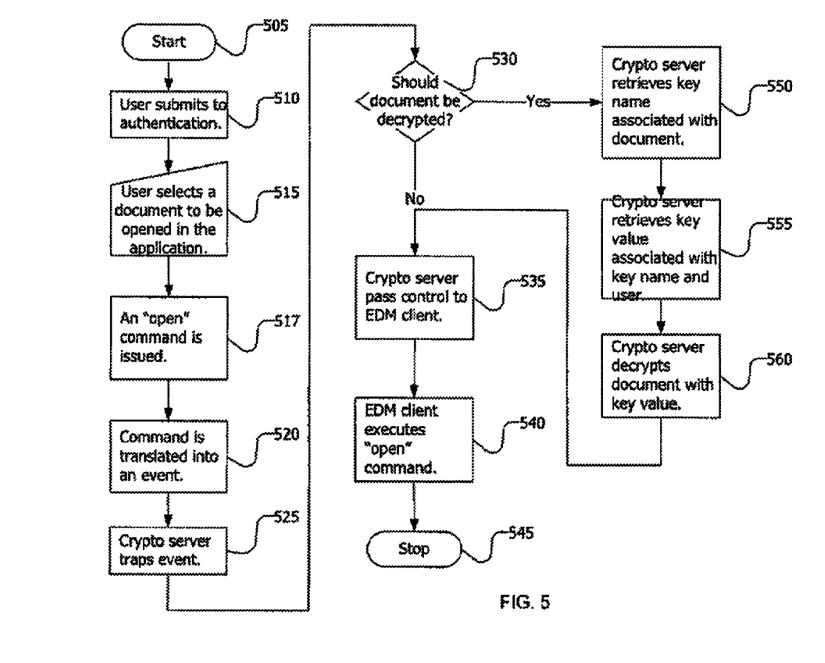
FIG. 5 is a flowchart of a decryption process.

Turning now to FIG. 5, there is shown a flowchart of the decryption process in accordance with the invention. After the process begins (step 505), it is preferred that the user submit to authentication (step 510). Authentication (step 505) preferably is the same for encryption and decryption.

At some point after the user has been authenticated, the user will wish to open a document into the application 350 (step 515). The file open command may be issued from within the application 350 or may be issued by a second application, with the nature of the document such that the application 350 will actually open the document and provide access to the document's contents. In any case, once the user selects a document to be opened, an "open" command is issued (step 517). The open command is then translated into an event (step 520), and the crypto server 330 traps this event (step 525).

The trapped event has the effect of alerting the crypto server 330 that it may be necessary to decrypt the document. However, preferably before decrypting the document, the crypto server 330 tests whether the document should be decrypted (step 430). Preferably, these tests are complimentary to those described above with respect to the encryption process.

If for any reason the document is not to be decrypted, then the crypto server 330 passes control to the EDM client 320 which performs the "open" command. Alternatively, the decision not to decrypt, for one or more reasons, may result in an error message being displayed to the user, and may result in the document not being opened. At this point, for documents which are not to be decrypted, the method is complete (step 545).

If, in step 530, the document is to be decrypted, then the crypto server 330 preferably obtains a decryption key name which is associated with the document (step 550). The decryption key name is preferably obtained from the file's header or from the encrypted files table.

The crypto server 330 then uses the decryption key name to retrieve a decryption key value which is associated with the decryption key name (step 555). Preferably, the decryption key value, like the encryption key value, is also related to the identity of the user, and this is accomplished by retrieving the decryption key value from the key table stored in the smart card 265 and associated with the decryption key name.

Once the crypto server 330 has the decryption key value, the crypto server 330 then decrypts the document with the decryption key value (step 560), and passes control to the EDM client (step 535) so that the decrypted copy of the document may be opened into the application (step 540). At this point, for documents which are to be decrypted, the method is complete (step 545).

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

What is claimed is:

1. A system, comprising:
 a storage device storing authentication data;
 a crypto server receiving a document over a communications network from a first computing device, the crypto server encrypting the document with a first key and securing the first key with authentication data from the storage device; and
 an access server transmitting the encrypted document over the communications network to a second computing device.

2. The system according to claim 1, wherein the authentication data comprises a password.

3. The system according to claim 1, wherein the authentication data comprises biometric data.

4. A mobile communication device, comprising:
 a message module receiving an encrypted document and a first key over a communications network, the first key secured with authentication data;
 a user interface module receiving an open command related to the encrypted document;
 a crypto module, in response to the open command, retrieving authentication data to obtain access to the decryption key, and decrypting the encrypted document with the first key; and
 a display displaying the decrypted document.

5. The mobile communication device according to claim 4, wherein the authentication data comprises a password.

6. The mobile communication device according to claim 4, wherein the authentication data comprises biometric data.

7. A system for decrypting documents to be opened in an application program comprising:
 a recordable media;
 a memory storing the names of encrypted documents and a decryption key for the encrypted documents, the decryption key protected via authentication data; and
 a crypto module:
  automatically trapping an "open" command issuing for a selected document to be opened in an application program;
  determining, using at least the first memory, if the selected document should be decrypted and, upon determining the selected document should be decrypted, retrieving authentication data to obtain access to the decryption key;
  decrypting the encrypted document using the decryption key; and
  automatically passing control to the application program.

8. The system according to claim 7, wherein the authentication data comprises a password.

9. The system according to claim 7, wherein the authentication data comprises biometric data.

\* \* \* \* \*